Patent 3,254,072, Patented May 31, 1966

3,254,072
MONOAZO QUINOLINE DYESTUFFS

Paul L. Stright, Hamburg, N.Y., assignor to Allied Chemical Corporation, New York, N.Y., a corporation of New York
No Drawing. Filed Feb. 28, 1963, Ser. No. 261,858
6 Claims. (Cl. 260—155)

This invention relates to novel monoazo dyestuffs. More particularly it relates to novel monoazo quinoline dyestuffs which are particularly suitable for dyeing normally solid polymers of α-olefins having 2 to 4 carbon atoms and to processes for the preparation thereof.

The novel dyestuffs of my invention comprise 2(8-quinolinylazo)-1,3-diketones and are represented by the following general formula:

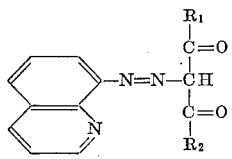

wherein $R_1$ and $R_2$ represent the same or different organic radicals selected from the group consisting of lower alkyl, phenyl, chlorophenyl, tolyl, furyl and thienyl, and wherein the quinoline nucleus may be further substituted by radicals selected from the group consisting of lower alkyl, lower alkoxy, halogen, nitro, methyl sulfamyl, lower alkyl sulfonyl, monocyclic aryl sulfonyl and N,N-dimethylamino.

As mentioned previously the novel dyestuffs of this invention have special utility in the dyeing and printing of polymers of α-olefins such as ethylene and particularly propylene. Such polymers have been produced in steadily increasing quantities and grades in recent years. By virtue of their many valuable characteristics including mechanical strength, high elasticity, resistance to solvents and other elements, the polymers have found their way into a multitude of useful applications in the form of films, filaments, yarns, fabrics, ropes, molded products, and the like. However, because of their extreme chemical inertness and hydrophobic character, these polymers have shown little affinity for the dyestuffs and pigments generally available for the coloration of natural and synthetic materials. Attempts to effect the coloration of α-olefin polymers by compounding pigments into the resin, as in Banbury mixers, compound extruders, or the like, were not entirely satisfactory due to the difficulty in obtaining satisfactory, or even adequate, dispersion of the pigment in the resin. Although it has been found that disperse dyestuffs produce light to medium shades in poly-α-olefins, the fastness to light and washing of such colorations leaves much to be desired. Other techniques for improving the dyeability of poly-α-olefins, as by grafting or otherwise introducing polymeric chains containing functional groups to the polyolefin or by applying oil soluble dyes emulsified in water and oil to the polymer have not been entirely successful due to cost or other considerations.

Polymers of α-olefins, especially polypropylene, are known to be subject to degradation upon exposure to heat, such as is encountered during mechanical processing as for example during molding, extrusion, and the like, and to sunlight as encountered by the finished articles, such as rugs, draperies and automobile seat covers. This sensitivity to heat and to sunlight can be overcome, at least to a significant degree, by incorporating in the polymer various stabilizers, many of which are compounds, inorganic and organic, of metals such as chromium, nickel, zinc, cobalt, copper, cadmium and the like. These metals belong to the transition group of elements and characteristically are capable of forming Werner type complex compounds. Nickel compounds, such as the bis(p-alkylphenol) monosulfide nickel compounds disclosed in U.S. Patent 3,006,885 as stabilizers for polypropylene, are especially effective in this connection. Inorganic compounds, as disclosed in French Patents 1,142,024 and 1,142,025, are likewise effective as stabilizers for these valuable polymers. The use of compounds of various other of the above metals as additives to polyproplyene is disclosed in U.S. Patents 2,971,940, 2,980,645 and 2,997,456.

The stabilizing compounds are normally used in relatively small amounts, i.e. from about 0.001% to about 3% by weight, and are generally incorporated in the polymer during the processing stage. Such small amounts of these compounds normally suffice to provide adequate stabilization of the polymer against degradation by heat and light and hereinafter polymers containing the same shall be referred to as "stabilized."

It has now been discovered that the monoazo compounds of my invention are excellent dyestuffs for solid polymers of α-olefins having from 2 to 4 carbon atoms per unit and containing Werner complex forming metals such as the "stabilized" polymers referred to above. The new dyestuffs are applied to the olefin polymer as aqueous dispersions and yield colorations which are characterized by fastness to light and to washing as well as by the strength, i.e., depth of coloration, of the resulting dyeing.

The novel dyestuffs of my invention, while generally applicable for the coloration of polymers of α-olefins containing 2 to 4 carbon atoms per unit and containing also a Werner complex forming metal, are particularly valuable as colorants for crystalline, isotactic polypropylenes having an intrinsic viscosity above 1.0 (measured in Tetralin at 135° C.) which are capable of use in the production of fibers, films, molded articles and the like. Such polypropylenes are well known in the art and are commercially available. They are usually produced by polymerization of propylene in the presence of Ziegler type catalysts and inert liquids. Such polypropylene often contain Werner complex forming metals added as stabilizers during the processing thereof or as incidental residues resulting from various treatments of the polymer during its preparation.

The novel compounds of my invention can be prepared by several well known general methods for the preparation of monoazo derivatives. For example, an 8-aminoquinoline is diazotized in a conventional manner and the diazonium salt is coupled in alkaline medium with a 1,3-diketone coupling compound. The monoazo product is generally insoluble and may be separated by filtration, washed and dried.

Examples of the 8-aminoquinoline compounds suitable for use in this connection include the following:

8-aminoquinoline
8-aminoquinaldine
8-amino-6-chloro-quinoline
8-amino-5-methoxyquinoline
8-amino-5,7-dichloroquinoline
8-amino-5,7-diethoxyquinoline
8-amino-6-nitroquinoline 8-amino-2,3-dimethylquinoline
8-amino-6-methoxy-5-nitroquinoline
8-amino-6-trifluoromethylquinoline
8-amino-5-(N-methylsulfamyl)quinoline
8-amino-6-(phenylsulfonyl)quinoline
8-amino-7-chloro-2,4-dimethylquinoline
8-amino-6-methylsulfonylquinaldine
8-amino-6-thioethylquinoline
8-amino-6-β-hydroxyethylquinoline
8-amino-6-n-butylaminoquinoline
8-amino-6-N,N-(dimethylamino)quinoline As examples of the coupling components suitable for use in the preparation of the novel dyestuffs of my invention, the following are mentioned:

2,4-pentanedione
1-phenyl-2,4-pentanedione
1-(4-chlorophenyl)-2,4-pentanedione
1,3-(diphenyl)-1,3-propanedione
1,3-bis(2-chloro-4-methylphenyl)-1,3-propanedione
1,1,1-trifluoro-2,4-pentanedione
1,1,1-trifluoro-4-(2-thienyl)-2,4-butanedione
1-(2-furyl)-1,3-butanedione The novel metallizable monoazo dyestuffs of my invention are practically insoluble in water at ordinary temperatures. As such, they are applied to the poly-α-olefin materials in the matter of disperse dyestuffs, i.e., as aqueous dispersions, which can be obtained by various means. For example, the monoazo compound is ground in the presence of a dispersing agent by means of a micropulverizer, sand, inorganic salt, and the like. The more finely divided the dyestuff composition is, the more effective as a dye the composition will be, as is generally known. The dispersed dye is admixed with a sufficient quantity of water to obtain a thoroughly wetted paste or slurry, which is then diluted with a further quantity of water to obtain the desired concentration of dyestuff in the ultimate dyebath. For dyeing, the poly-α-olefin material is entered into the dyebath, which may or may not contain the usual dyeing adjuvants and the dyeing effected by heating the bath to a suitable dyeing temperature and by working the material in the heated bath for a sufficient period, usually about one hour, to obtain the desired depth of shade. During the latter period, the adjustment of the bath to a pH of below 5 will usually result in a better exhaustion of the dyestuff from the dyebath. The dyed material may then be rinsed with water, washed with warm (60° C.) mild soap solution, rinsed again with water and dried.

The amount of dyestuff employed relative to the amount of poly-α-olefin material to be dyed can be varied over a wide range. The amount used will depend to a major extent upon the depth of shade desired and to a lesser but still important extent upon the metal content of the polymer. It is significant also to point out that the various Werner complex forming metals will vary somewhat in the ease with which they form the complex compounds with the monoazo dyestuffs. In most instances, deep shades can be obtained from 0.5% dyeings which shades are increased little in intensity by increasing the dye concentration to 2.0% or more. Light shades can be obtained by the use of as little as 0.05% or less of these dyestuffs.

The excellent results obtained on dyeing poly-α-olefin materials containing a Werner complex forming metal with the dyestuffs of my invention are indeed highly surprising, since comparable compounds derived from diazotized heterocyclic amines, such as 2-aminothiazole, and 2-amino-1,3,4-triazine, coupled into 1,3-diketones such as 2,4-pentanedione, yield dyeings which are of poor fastness. On the other hand, the novel quinolinylazo-1,3-diketone dyes of this invention produce, on "stabilized" polypropylene, deep shades of excellent fastness to light, to washing, to dry cleaning solvents, to crocking and the like. It can thus be said that in view of the unpredictable dyeing characteristics of these compounds, the novel compounds of my invention represent a surprising and useful discovery.

The following examples will illustrate the present invention. Parts and percentages are by weight and temperatures are given in degrees centigrade.

EXAMPLE 1

To a cold (below 10° C.) solution of 14.4 parts of 8-aminoquinoline in 39 parts of 20° Bé. hydrochloric acid and 500 parts of water, 50 parts of a 2 molar aqueous solution of sodium nitrite were added. The mixture was agitated for about 3 hours and then the excess nitrous acid was destroyed with sulfamic acid. The diazonium salt solution was added to a solution of 10 parts of 2,4-pentanedione, 15 parts of sodium carbonate, 9 parts of 50° Bé. caustic soda in 1000 parts of water in about 25 minutes. The slurry of yellow product was agitated at ambient temperature for about 16 hours and then filtered. The filter cake was washed with 1000 parts of 0.5% aqueous sodium hydroxide solution and then reslurried in 500 parts of water. The slurry was rendered neutral to Nitrazine Yellow by the addition of about 4.5 parts of 20° Bé. hydrochloric acid. The slurry was agitated for about 16 hours, filtered, washed chloride free with water and dried. The greenish yellow powder thusly obtained was 3(8-quinolinylazo)-2,4-pentanedione having the formula:

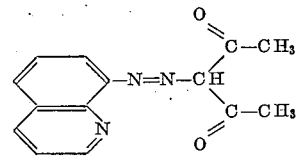

and melting at 200° to 204°.

This dyestuff was applied to "stabilized" polypropylene (containing 0.12% by weight of a nickel compound calculated as nickel) as a disperse dyestuff. The resultant dyeing was a deep yellow of excellent fastness to light and to washing.

EXAMPLES 2-8

The procedure of Example 1 was repeated using various 8-aminoquinoline compounds and 1,3-diketone couplers as identified below in Table I. The resulting monoazo compounds were used as disperse dyes to color "stabilized" polypropylene and the shades obtained are also given in the following table.

Table I

| Ex. | 8-Amino-Quinoline Compound | 1,3-diketone Compound | Shade |
|---|---|---|---|
| 2 | 2-methyl- | 1,3-diphenyl-1,3-propanedione. | Reddish yellow. |
| 3 | 6-methoxy- | do | Red-yellow. |
| 4 | 2-methyl-6-methoxy- | 2,4-pentanedione | Do. |
| 5 | 5,7-dimethyl- | do | Yellow. |
| 6 | 6-N-methylsulfamyl- | 1,3-bis(p-tolyl)-1,3-propanedione. | Do. |
| 7 | 2-methyl- | 2,4-pentanedione | Do. |
| 8 | do | 1-phenyl-1,3-butanedione | Red-yellow. |

It can thus be seen that a novel class of monoazo dyestuffs has been provided which is suitable for the coloration of normally solid polymers of α-olefins having 2 to 4 carbon atoms in each unit and containing a Werner complex forming metal in deep shades of excellent fastness characteristics.

As will be evident to those skilled in this art, the invention is not to be limited to the details of the foregoing purely illustrative examples and that changes can be made therein without departing from the scope or spirit of my invention.

This dispersion of these novel monoazo dyestuffs and the dyeing of poly-α-olefin materials with these dispersions can be carried out as disclosed in co-pending U.S. application Serial No. 196,920, filed May 23, 1962, and in co-pending U.S. application, Serial No. 2,574,889, filed February 12, 1963, the disclosures of which are hereby incorporated by reference.

I claim:
1. Monoazo compounds having the formula

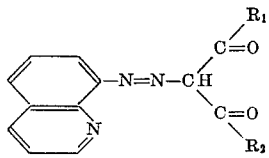

wherein $R_1$ and $R_2$ represent the same or different organic radicals selected from the group consisting of lower alkyl, phenyl, chlorophenyl, tolyl, furyl and thienyl, and wherein the quinoline nucleus may be further substituted by radicals selected from the group consisting of lower alkyl, lower alkoxy, halogen, nitro, methyl sulfamyl, lower alkyl sulfonyl, monocyclic aryl sulfonyl and N,N-dimethylamino.

2. Monoazo compounds as defined in claim 1 wherein $R_1$ and $R_2$ are methyl radicals.
3. Monoazo compounds as defined in claim 1 wherein $R_1$ and $R_2$ are phenyl radicals.
4. Monoazo compounds as defined in claim 1 wherein $R_1$ is a phenyl radical and $R_2$ is a methyl radical.
5. Monoazo compounds as defined in claim 1 wherein $R_1$ and $R_2$ are tolyl radicals.
6. 3(8-quinolinylazo)-2,4-pentanedione.

References Cited by the Examiner

UNITED STATES PATENTS

| | | | |
|---|---|---|---|
| 2,283,220 | 5/1942 | McNally et al. | 260—155 |
| 2,318,968 | 5/1943 | Proescher et al. | 260—155 |
| 2,801,225 | 7/1957 | Harding | 260—41 |
| 2,831,827 | 5/1958 | Hopff et al. | 260—41 |

CHARLES B. PARKER, *Primary Examiner.*

REYNOLD J. FINNEGAN, FLOYD D. HIGEL,
*Assistant Examiners.*